United States Patent
Gao et al.

(10) Patent No.: US 11,985,341 B2
(45) Date of Patent: May 14, 2024

(54) ASSIGNING BIT BUDGETS TO PARALLEL ENCODED VIDEO DATA

(71) Applicant: ATI Technologies ULC, Markham (CA)

(72) Inventors: Wei Gao, Markham (CA); Gabor Sines, Markham (CA); Ihab M. A. Amer, Markham (CA); Crystal Yeong-Pian Sau, Markham (CA); Feng Pan, Markham (CA); Dong Liu, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/847,120

(22) Filed: Jun. 22, 2022

(65) Prior Publication Data

US 2023/0421787 A1 Dec. 28, 2023

(51) Int. Cl.
| | |
|---|---|
| *H04L 65/70* | (2022.01) |
| *H04N 19/14* | (2014.01) |
| *H04N 19/146* | (2014.01) |
| *H04N 19/172* | (2014.01) |
| *H04N 19/176* | (2014.01) |
| *H04N 19/436* | (2014.01) |

(52) U.S. Cl.
CPC .......... *H04N 19/436* (2014.11); *H04N 19/14* (2014.11); *H04N 19/146* (2014.11); *H04N 19/172* (2014.11); *H04N 19/176* (2014.11)

(58) Field of Classification Search
CPC .......... H04L 63/0428; H04L 2463/101; H04L 63/10; H04L 65/612; H04L 65/1101; H04L 65/762; H04L 65/70; H04L 65/80; H04N 21/6125; H04N 21/47202; H04N 7/17318; H04N 21/41407; H04N 21/4788; H04N 21/44008; H04N 21/2223; G06F 16/639; G06F 16/635; G06F 21/10; G06F 16/134; G06F 16/1834; G06F 16/48; G06F 16/4387; G06F 16/64
USPC ......................................................... 375/222
See application file for complete search history.

(56) References Cited

U.S. PATENT DOCUMENTS

| | | | | |
|---|---|---|---|---|
| 5,949,490 | A * | 9/1999 | Borgwardt | H04N 19/14 375/E7.218 |
| 11,276,411 | B2 * | 3/2022 | Eksler | G10L 19/12 |
| 2010/0054329 | A1 * | 3/2010 | Bronstein | H04N 19/154 375/240.03 |
| 2010/0195733 | A1 * | 8/2010 | Yan | H04N 19/107 375/E7.123 |

(Continued)

OTHER PUBLICATIONS

Kulupana, G., et al., "End User Video Quality Prediction and Coding Parameters Selection at the Encoder for Robust HEVC Video Transmission", IEEE, Transactions on Circuits and Systems for Video and Technology, vol. 29, Issue 11, Nov. 9, 2018, 14 pgs.

*Primary Examiner* — Eva Y Puente
(74) *Attorney, Agent, or Firm* — Volpe Koenig (57) ABSTRACT

A technique for encoding video is provided. The technique includes for a first portion of a first frame that is encoded by a first encoder in parallel with a second portion of the first frame that is encoded by a second encoder, determining a historical complexity distribution; determining a first bit budget for the first portion of the first frame based on the historical complexity distribution; and encoding the first portion of the first frame by the first encoder, based on the first bit budget.

20 Claims, 5 Drawing Sheets

(56) References Cited

U.S. PATENT DOCUMENTS

| | | | |
|---|---|---|---|
| 2013/0010864 A1* | 1/2013 | Teng | H04N 19/172 |
| | | | 375/E7.258 |
| 2017/0188039 A1* | 6/2017 | Siddiqui | H04N 19/51 |
| 2018/0184089 A1* | 6/2018 | Zhang | H04N 19/114 |

* cited by examiner

ASSIGNING BIT BUDGETS TO PARALLEL ENCODED VIDEO DATA

BACKGROUND

One aspect of video encoding involves conversion of pixels in a frame of video into groups of pixels, often known as blocks. A lossy compression step downgrades the fidelity of the representation of the blocks. The amount of data used for any particular block is based at least in part on a quality value set for that block. It is important to set quality values for different blocks in a matter that produces good visual results.

BRIEF DESCRIPTION OF THE DRAWINGS

A more detailed understanding may be had from the following description, given by way of example in conjunction with the accompanying drawings wherein.

DETAILED DESCRIPTION

A technique for encoding video is provided. The technique includes for a first portion of a first frame that is encoded by a first encoder in parallel with a second portion of the first frame that is encoded by a second encoder, determining a historical complexity distribution; determining a first bit budget for the first portion of the first frame based on the historical complexity distribution; and encoding the first portion of the first frame by the first encoder, based on the first bit budget.

Figure 1:
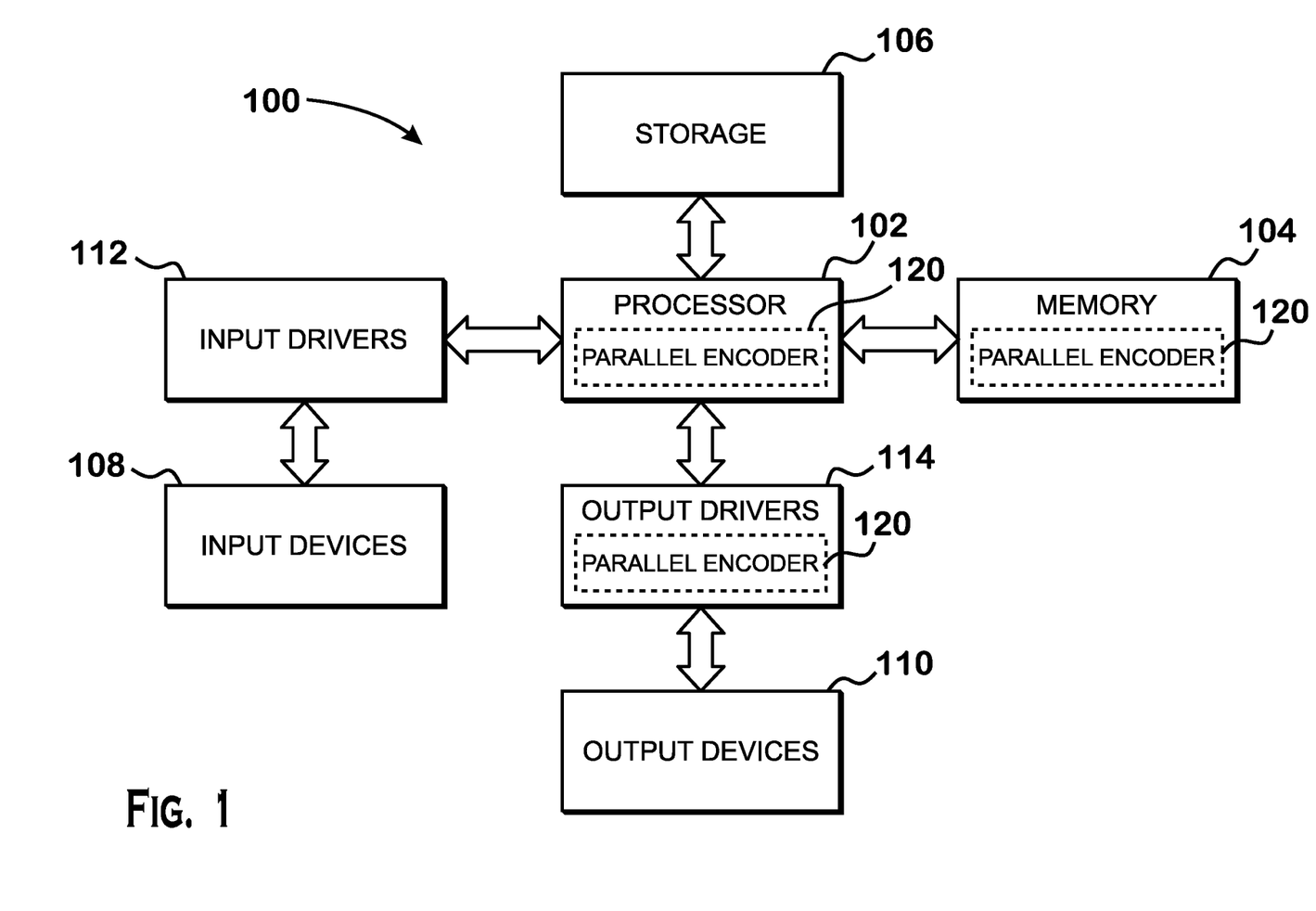
FIG. 1 is a block diagram of an example device in which aspects of the present disclosure are implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 optionally includes an input driver 112 and an output driver 114. It is understood that the device 100 optionally includes additional components not shown in FIG. 1.

The processor 102 includes one or more of: a central processing unit (CPU), a graphics processing unit (GPU), a CPU and GPU located on the same die, or one or more processor cores, wherein each processor core is a CPU or a GPU. The memory 104 is located on the same die as the processor 102 or separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110.

A parallel video encoder 120 (sometimes just "parallel encoder 120" or just "encoder 120") is shown in two different alternative forms. In a first form (shown in processor 102 and memory 104), the parallel video encoder 120 is software that is stored in the memory 104 and that executes on the processor 102 as shown. In this first form, the encoder 120 is embodied mostly as software. In a second form, the encoder 120 is at least a portion of a hardware graphics engine that resides in output drivers 114. In this second form, the encoder 120 is implemented at least partially as hardware. In other forms, the encoder 120 is a combination of software and hardware elements, with the hardware residing, for example, in output drivers 114, and the software executed on, for example, the processor 102. In some examples, the encoder 120 has a parallel architecture that includes multiple individual hardware encoders. Each individual hardware encoder is assigned a different portion of a frame to encode.

Figure 2A:
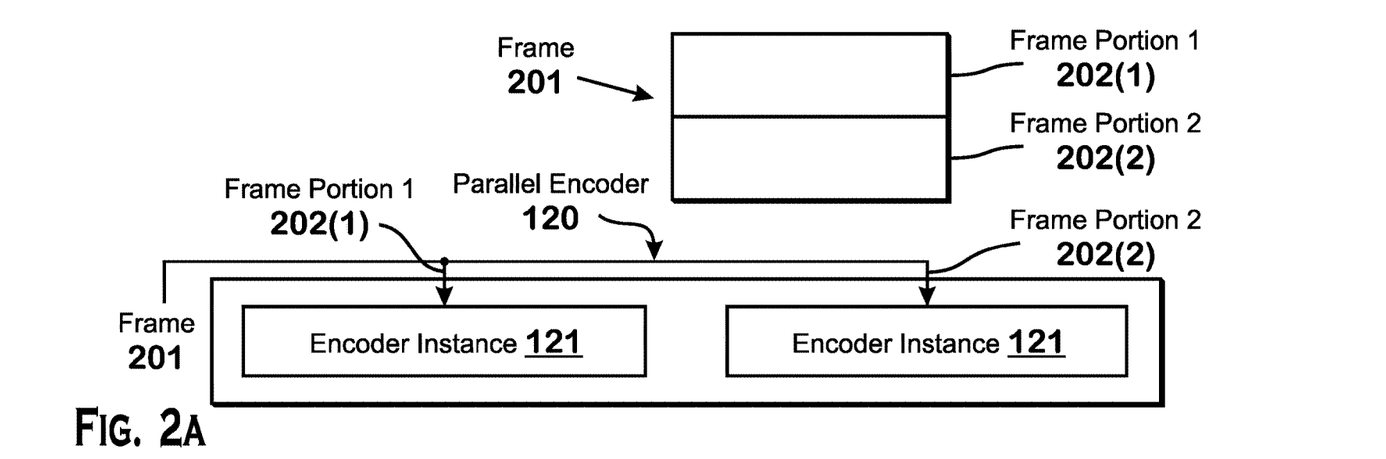
FIG. 2A illustrates a parallel encoder according to an example.

FIG. 2A illustrates a parallel encoder 120 according to an example. As shown, the parallel encoder 120 includes a first encoder instance 121 and a second encoder instance 121. Each encoder instance 121 accepts and encodes a different portion 202 of a frame 201. The different portions 202 of the frame 201 are spatially separate portions of the frame 201. In an example, a first encoder instance 121 is assigned a top portion of the frame 201 (e.g., frame portion 1 202(1)) and the second encoder instance 121 is assigned a bottom portion of the frame 201 (e.g., frame portion 2 202(2)), as illustrated in the example of FIG. 2A. In another example, the first encoder instance 121 is assigned a left portion and the second encoder instance 121 is assigned a right portion. Other divisions of work are possible. Each encoder instance 121 independently processes the frame portion 202 assigned to that encoder instance 121. In some examples, independent processing means that an encoder instance 121 does not communicate data for a particular frame with another encoder instance in the course of encoding the particular frame. It is possible, however, for an encoder instance 121 to receive data about previous frames from another encoder instance 121 or from a memory or other hardware or software entity unit such as a hardware or software coordinator (not shown in FIG. 2A). In other examples, independent processing means that an encoder instance 121 is assigned to generate encoded frame data for the frame portion 202 assigned to that encoder instance 121, but not for any frame portion 202 assigned to any other encoder instance 121. It should be noted that each frame portion 202 represents an independent portion of the frame 121, meaning that each frame portion 202 is spatially separate from each other frame portion 202. For example, macroblocks that belong to one frame portion 202 are not included with any other frame portion 202, and do not overlap any other frame portion 202. In sum, each encoder instance 121 generates encoded video data for a frame portion 202 assigned to that encoder instance 121 but not for any other frame portion 202, and, in some examples, each encoder instance 121 generates this encoded video data without communicating with any other encoder instance 121 about the current frame. In various examples, the frame portions 121 are completely contiguous portions of the frame 201 (for example, as shown in FIG. 2A) or include multiple disconnected portions (such as tiles) of the frame 201.

Figure 2B:
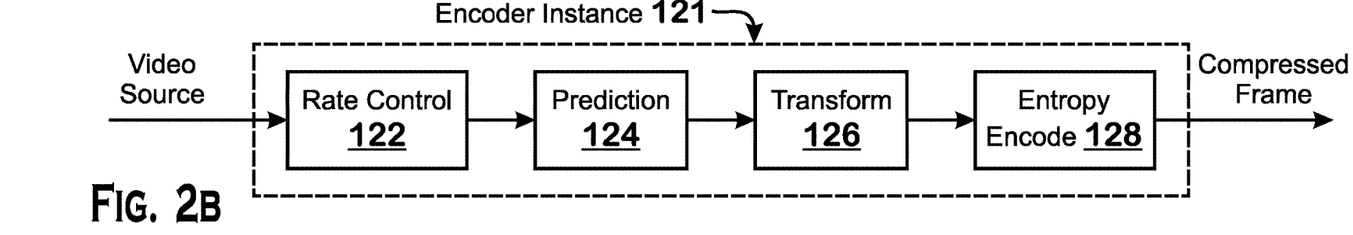
FIG. 2B presents a detailed view of an encoder instance of FIG. 2A, according to an example.

FIG. 2B presents a detailed view of an encoder instance 121 of FIG. 2A, according to an example. The encoder instance 121 accepts a frame 201, encodes the frame 201 to produce a compressed frame (or "encoded video"), and outputs the compressed frame for display, storage, or other use. Embodiments of the encoder instance 121 may include blocks other than those shown. The encoder instance 121 includes a rate control block 122, a prediction block 124, a transform block 126, and an entropy encode block 128. In some alternatives, the encoder instance 121 implements one or more of a variety of known video encoding standards (such as MPEG2, H.264, or other standards), with the prediction block 124, transform block 126, and entropy encode block 128 performing respective portions of those standards. In other alternatives, the encoder instance 121 implements a video encoding technique that is not a part of any standard.

The prediction block 124 performs prediction techniques to reduce the amount of information needed for a particular frame. Various prediction techniques are possible. One example of a prediction technique is a motion prediction based inter-prediction technique, where a block in the current frame is compared with different groups of pixels in a different frame until a match is found. Various techniques for finding a matching block are possible. One example is a sum of absolute differences technique, where characteristic values (such as luminance) of each pixel of the block in the current block is subtracted from characteristic values of corresponding pixels of a candidate block, and the absolute values of each such difference are added. This subtraction is performed for a number of candidate blocks in a search window. The candidate block with a score deemed to be the "best," such as by having the lowest sum of absolute differences, is deemed to be a match. After finding a matching block, the current block is subtracted from the matching block to obtain a residual. The residual is further encoded by the transform block 126 and the entropy encode block 128 and the block is stored as the encoded residual plus the motion vector in the compressed video. This allows the block to be reconstructed for playback by decoding the residual and applying the decoded residual to the group of pixels referenced by the motion vector to arrive at a decoded block for display, storage, or other use. Note that although a comparison technique is described for prediction of blocks between frames, a similar technique can also be used to compress blocks within a single frame by storing one block as a reference to another block in that frame plus a residual.

The transform block 126 performs an encoding step which is typically lossy, and converts the pixel data of the block into a compressed format. An example transform that is typically used is a discrete cosine transform (DCT). The discrete cosine transform converts information characterizing the block into a sum of weighted visual patterns, where the visual patterns are distinguished by the frequency of visual variations in two different dimensions. The weights afforded to the different patterns are referred to as coefficients. These coefficients are quantized and are stored together as the data for the block. Quantization is the process of assigning one of a finite set of values to a coefficient. The total number of values that are available to define the coefficients of any particular block is defined by the quantization parameter (QP). A higher QP means that the step size between values having unity increment is greater, which means that a smaller number of values are available to define coefficients. A lower QP means that the step size is smaller, meaning that a greater number of values are available to define coefficients. A lower QP requires more bits to store, because more bits are needed for the larger number of available coefficient values, and a lower QP requires fewer bits. Visually, a higher QP is associated with less detail and a lower QP is associated with more detail. Although the concept of QP is defined herein, the term "quality value" will be used herein to generally refer to a value indicating the amount of data afforded for encoding a block, and thus the visual quality with which a block is represented in the encoded video. Numerically, quality value can be thought of as a ranking. Thus, a higher quality value means that a block is afforded a lower number of bits and is thus encoded with lower quality and a lower quality value means that a block is afforded a higher number of bits and is thus encoded with higher quality. It should be understood that although quality values are described herein as a "ranking" (with a lower number meaning higher quality and a higher number meaning lower quality), it is possible for other types of quality values to be used. For example, it is possible to use quality values where a higher number means a higher quality and a lower number means a lower quality. It should be understood that the transform operations of the transform block 126 can be applied to a variety of aspects of a block, such as the luminance, and various types of residuals, such as intra-frame residuals (residuals for comparison of blocks in the current frame), inter-frame residuals (residuals for comparison of blocks in different frames), or other aspects.

The entropy encode block 128 performs entropy coding on the coefficients of the transformed blocks. Entropy coding is a lossless form of compression. Examples of entropy coding include context-adaptive variable-length coding and context-based adaptive binary arithmetic coding. In general, entropy coding reduces the amount of data necessary to store a set of values by recoding that set of values to use a reduced number of bits to store each value. Entropy coding takes advantage of the fact that the entire set of possible numerical values in is generally not used within a small set of data, meaning that each value in that small set of data can be represented as one of a small number of choices, each of which is actually within that set of data. The entropy coded transform coefficients describing the residuals (or other aspects), the motion vectors, and other information such as per-block QPs are output and stored or transmitted as the encoded video.

The rate control block 122 performs rate control, including analysis on the source video to adjust parameters used during encoding. One operation performed by the pre-encoding analysis block 122 includes analyzing the source video to determine what quality values (e.g., quantization parameters) should be afforded to the blocks for encoding. In general, the rate control block 122 is provided with or determines a bit budget and attempts to encode blocks of a frame to fit within that bit budget. A wide variety of factors can affect the bit budget. In an example, the rate control block 122 is aware of a bandwidth limit that the encoded frame must fit within. This bandwidth limit is represented as an amount of data per unit of time. By knowing the number of frames in such a unit of time (e.g., frames per second), the rate control block 122 is able to calculate the number of bits afforded to each frame or block. In another example, the rate control block 122 is aware of some other characterization for size of the video frames, such as a user's quality selection or some other measure, and sets the bit budget for frames and/or blocks based on this other characterization.

One way to vary the amount of data that a frame consumes is by varying the quantization parameters of the blocks of that frame. As described elsewhere herein, the quantization parameter indicates the number of possible values that the DCT coefficients can have. A higher number of possible values is associated with higher fidelity but also a larger amount of data, and a lower number of possible values is associated with lower fidelity but less data. Because the exact amount of data necessary to store a block is dependent on the contents of the block, in addition to the quantization parameters, it is not possible to deterministically set quantization parameters to match a desired bit budget. Therefore, rate control involves estimating or predicting the quantization parameters that will result in a particular bit budget being met. In addition, because the bit budget should be allocated "intelligently" to account for varying visual complexity or perceptual importance of blocks across a frame, rate control involves matching quantization parameters to a measure of complexity or perceptual importance.

In the type of parallel encoding described herein, with multiple encoder instances 121 independently encoding separate portions of a frame 201, it is difficult for the encoder instances 121 to cooperate in allocating bit budget to blocks within the portions 202. More specifically, as described above, it is desirable for rate control to set quantization parameters such that the total frame encoding fits within a bit budget. Moreover, it is generally desirable to allocate more bits to the blocks that would benefit the most from such additional data (e.g., more bits should be assigned to more complex blocks). However, with two encoder instances 121 operating in parallel, each encoder instance 121 is not aware of the complexity of the blocks assigned to the other encoder instance. For example, the frame portion 202(1) could be very simple (e.g., a solid blue sky), while the frame portion 202(2) is very complex (e.g., a foreground). However, without this knowledge, each encoder instance 121 could assign an equivalent bit budget to the blocks within its respective frame portion 202. This would assign too many bits to the simple portion 202 and too few bits to the more complex portion 202. For this reason, techniques are provided herein to more appropriately allocate bit budget to the different frame portions 202 associated with different encoder instances 121 operating in parallel.

Figure 2C:
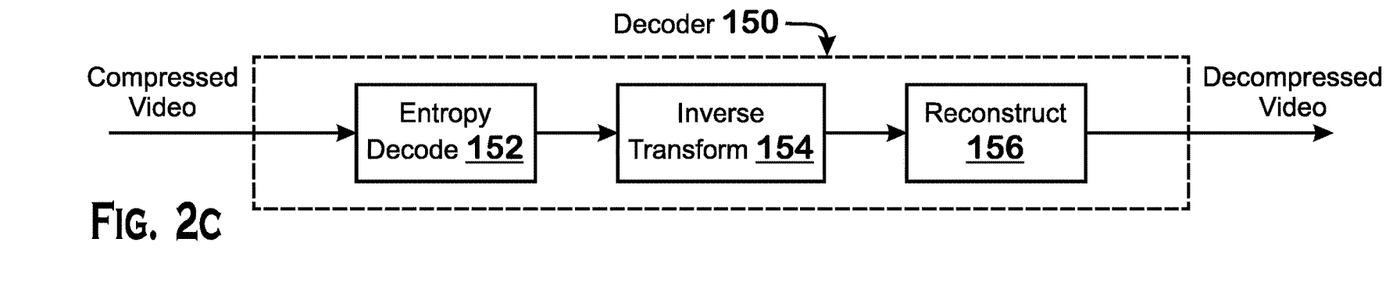
FIG. 2C represents a decoder for decoding compressed data generated by an encoder such as the encoder, according to an example.

For completeness, description of an example decoder 150 is now provided. FIG. 2C represents a decoder 150 for decoding compressed data generated by an encoder such as the encoder 120, according to an example. The decoder 160 includes an entropy decoder 152, an inverse transform block 154. The entropy decoder 152 converts the entropy encoded information in the compressed video, such as compressed quantized transform coefficients, into raw (non-entropy-coded) quantized transform coefficients. The inverse transform block 154 converts the quantized transform coefficients into the residuals. The reconstructed block 156 obtains the predicted block based on the motion vector and adds the residuals to the predicted block to reconstruct the block.

Note that the operations described for FIGS. 2A-2C only represent a small subset of the operations that encoder and decoders may use. In addition, the various blocks of the encoder 120 (including the encoder instances 121) and decoder 150 are implemented as software, hardware (e.g., fixed function circuitry), or a combination thereof.

Figure 3:
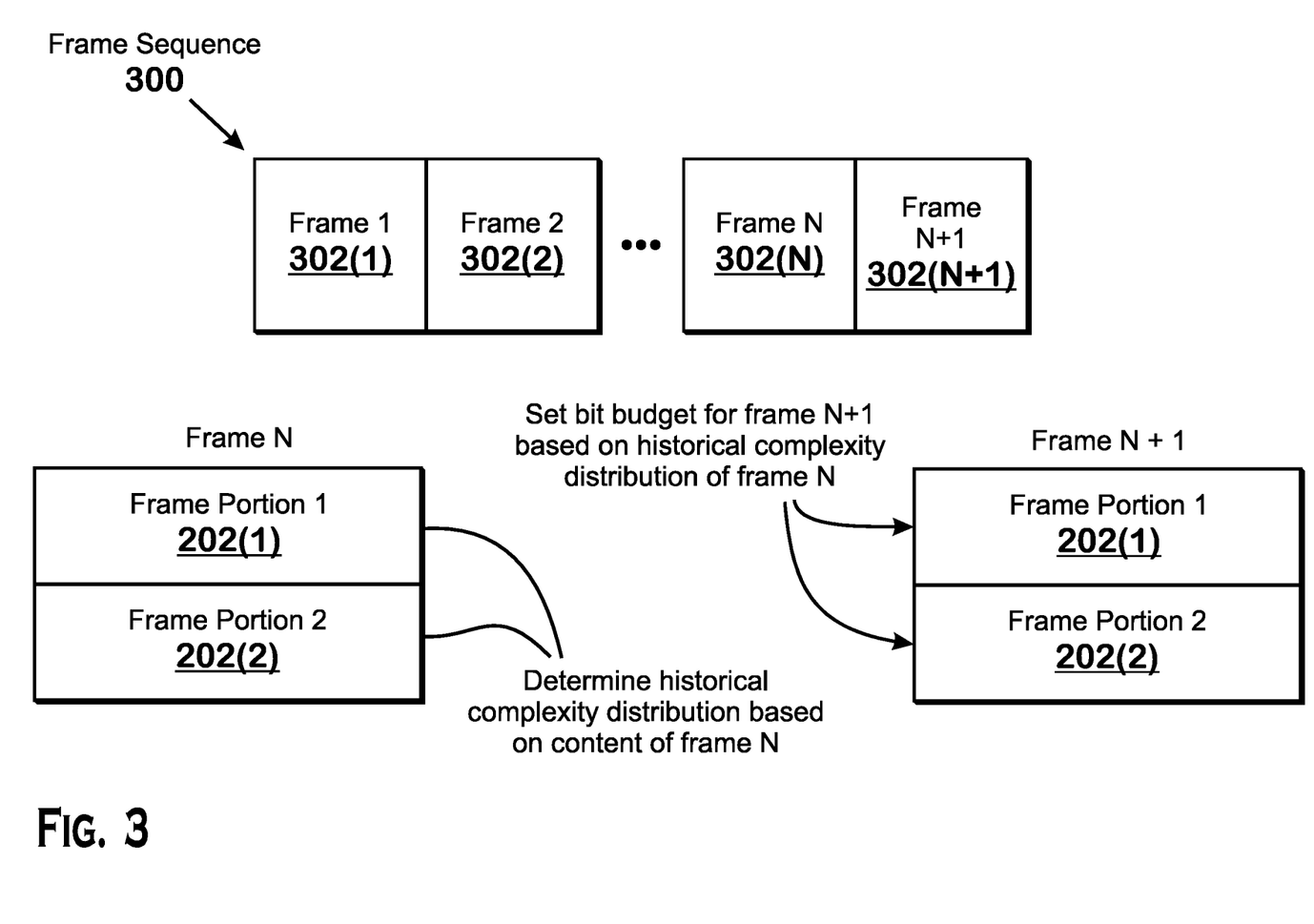
FIG. 3 illustrates operations for performing rate control by independent encoder instances, according to an example.

FIG. 3 illustrates operations for performing rate control by independent encoder instances 121, according to an example. A frame sequence 300 is illustrated, including N+1 frames 302. The frames 302 in the frame sequence 300 comprise a portion of video. Frames having higher frame numbers are later in the video than frames having lower frame numbers. For example, frame N+1 is later than frame N.

As described above, it is possible for the different frame portions 202 to have different "complexity," where "complexity" refers to characteristics of the content of the frame portions 202 that are related to determining an "appropriate" bit budget for that content. More specifically, it is possible for simple content (e.g., relatively solid color) or content with a lot of randomness to be "sufficiently" represented by a smaller number of bits than content with more detail that is considered perceptually significant to the human perceptual system. There are a wide variety of measures of complexity, described elsewhere herein.

In non-parallel encoding, it is possible for the encoder to assign bit budgets to blocks of a frame as the encoder proceeds through the frame because the encoder is aware of the entire amount of data actually consumed by encoded blocks and thus is aware of the remaining bit budget for the frame. Further, the non-parallel encoder would be able to afford each block of the frame an "appropriate" bit budget based on complexity. With the parallel encoder instances 121, however, each parallel encoder instance 121 is not aware of the complexity of the blocks assigned to other encoder instances 121. Thus, while a parallel encoder instance 121 is able to assign relative "appropriate" bit budgets based on complexity for each block that parallel encoder instance 121 is processing, the total bit budget assigned to the parallel encoder instance 121 may not be appropriate for the total, overall complexity of the blocks processed by that parallel encoder instance 121.

To address this issue, a parallel encoder instance 121 uses the "complexity distribution" of one or more previous frames 302 in determining the total bit budget assigned to that parallel encoder instance 121. The complexity distribution for a particular parallel encoder instance 121 is the ratio of a complexity measure of the one or more portions 202 assigned to that instance to the total complexity measure for the frame 302. The complexity measure of a frame 302 is a value that indicates the sum of all complexity measures of the portions 202 within that frame 302. The complexity measure of a portion 202 is a value that indicates complexity of the content of that portion 202. The complexity measure for a portion 202 or frame 302 is a value that is proportional to the bit budget for the portion 202 or frame 302. A higher complexity measure indicates that more bits will be assigned to a portion 202 or frame 302 and a lower complexity measure indicates that fewer bits will be assigned to a portion 202 or frame 302. The ratio of the complexity measure of a portion 202 to the complexity measure of a frame 302 thus indicates the percentage of bits of the bit budget of a frame will be assigned to the portion 202. Because the data from previous frames is available to generate the complexity distribution, there is no issue regarding data being unavailable due to the parallel encoder instances 121 operating in parallel, as the data is from frames prior to the frame being encoded and is therefore available. In sum, the parallel encoder instances 121 utilize historical complexity distributions to apportion the bit budgets between the parallel encoder instances 121 without having to communicate about encoding information for the current frame, by using data from the previous frame, which is more readily available.

A parallel encoder instance 121 (e.g., rate control 122) determines the complexity measure. In general, the complexity measure is a value that characterizes a block, portion 202, or frame as requiring fewer or more bits to encode. A parallel encoder instance 121 determines the complexity measure of a block by determining one or more of the following complexity measure component values: sum of absolute differences, rate-distortion cost, the number of non-zero DCT coefficients (for example, the number of non-zero high-frequency coefficients), the number of encoded bits, the intra ratio, or other factors.

The sum of absolute differences is a measure used during motion prediction or other operations that measures the difference between a block and a reference block. In an example, a parallel encoder instance 121 performs motion prediction to encode blocks. In an example, during motion prediction for a block, the parallel encoder instance 121 identifies a set of candidate reference blocks, calculates the sum of absolute differences between the pixels of the candidate reference blocks and the block for which motion prediction is being performed, and selects for motion prediction the block that has the lowest sum of absolute differences to be the reference block, from which the motion vector and residual are derived. The sum of absolute differences for the selected reference block is the value referred to above as used for the complexity measure. Although one use for sum of absolute differences is described, it should be understood that a wide variety of techniques utilize sum of absolute difference, and the sum of absolute difference for any such technique could alternatively or additionally be used as a complexity measure.

Regarding rate-distortion cost, this value represents the weighted sum of the distortion and the approximated coding bits. More specifically, the rate distortion cost represents the amount of fidelity or quality loss and the approximated number of coding bits. In some examples, the parallel encoding instance 121 uses this value to determine the complexity measure for a block.

The number of non-zero DCT coefficients represents complexity in that the more coefficients needed, the more bits are required to encode the block. A greater number of coefficients is associated with more complexity. In some examples, the parallel encoding instance 121 uses this value to determine the complexity measure for a block.

A number of encoded bits is a direct measure of the number of bits used to encode a block. Because rate control 122 attempts to assign bits to blocks based on complexity, the number of bits used to encode a block represents the rate control block's 122 previous determination of complexity, although there may be some degree of error. It should be understood that this measure of bits used to encode a block represents the number for a first frame, and that use of this measure to calculate complexity distribution is for use in a subsequent frame. In some examples, the parallel encoding instance 121 uses this value to determine the complexity measure for a block.

The intra ratio represents the number of blocks that are coded as intra blocks. An intra block is a block that is encoded without reference to another block (e.g., using residuals). The greater the ratio, the higher the complexity. In some examples, this measure is calculated for an entire frame portion 202. In other words, in some examples, the ratio of intra blocks to total blocks of a frame portion 202 is used to calculate the complexity measure for that frame portion 202.

To calculate the complexity measure of a frame portion 202, an encoder instance 121 instance calculates one or more of the complexity measure components values described above and, if necessary, combines those complexity measure component values to generate a complexity measure for the frame portion 202. In some examples, the encoder instance 121 calculates a complexity measure component value of one or more type for each block of a portion 202 and combines those complexity measure component values to generate a complexity measure component value for the portion 202. In some examples, the encoder instance 121 calculates multiple complexity measure component values, each of a different type, for each block and combines those values to generate a complexity measure for the frame portion 202. In some examples, the encoder instance 121 calculates one or more complexity measure component values directly for a portion 202 (such as when using intra ratio). In some various examples, the combining of complexity measure component values for a block includes any technically feasible mathematical or logical operation such as summing, averaging, or any other operation. In some examples, the encoder instance 121 combines complexity measures from multiple frames, such as using a running average or other techniques. Thus, in some examples, the encoder instance 121 calculates one or more complexity measures for a portion 202, combines those measures through any feasible technique, and sets the complexity measure for the portion 202 to the calculated value.

To obtain the complexity distribution for a frame portion 202 being encoded, an encoder instance 121 determines a comparison between the complexity measure of the frame portion 202 and the complexity measure for the entire frame. In some examples, the complexity measure for an entire frame is the sum of the complexity measures of the portions 202 of the frame. In some examples, the complexity distribution for a portion 202 is the ratio of the complexity measure of the portion 202 to the complexity measure of a frame.

The encoder instance 121 determines the bit budget for a frame portion based on the complexity distribution. In an example, the encoder instance 121 calculates a ratio of the complexity measure of a portion 202 and the complexity measure of a frame (the complexity distribution) and assigns as a bit budget for the portion 202 this ratio multiplied by the total bit budget for the frame. This operation allows the bits for the entire frame to be appropriately apportion between the frame portions 202 of the frame. Moreover, because the complexity measures used to determine the complexity distribution are generated from data for a previous frame, the encoder instances 121 are not required to use data from other encoder instances 121 for the current frame. As stated elsewhere, the bit budget for a frame can be determined in any technically feasible manner, such as by reference to an available amount of bandwidth over a communication link or a setting adjusted by a user.

Figure 4:
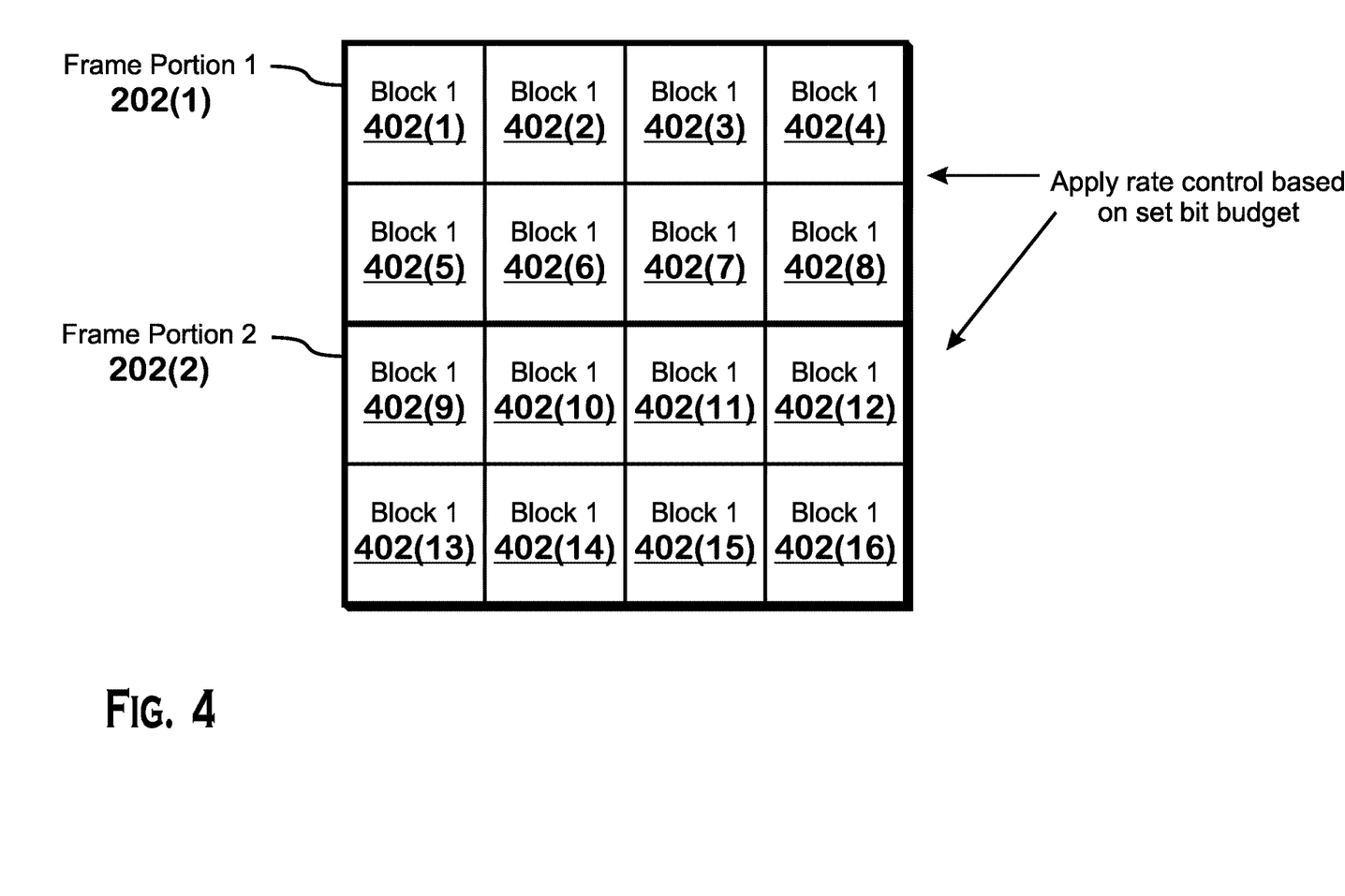
FIG. 4 illustrates rate control for blocks of frame portions, according to an example.

FIG. 4 illustrates rate control for blocks 402 (specifically, blocks 402(1)-402(16) in the example shown) of frame portions 202, according to an example. It should be understood that once an encoder instance 121 determines a bit budget for the frame portion(s) 202 assigned to that encoder instance 121, the encoder instance 121 performs rate control techniques to allocate bits to the individual blocks 402 of those frame portions 202 according to any technically feasible technique, such as by using the techniques described herein or by using any other technically feasible technique. Again, rate control 122 divides up the bit budgets assigned to the frame portion 202 to each individual block 402 and sets parameters such as the quantization parameters to actually encode the blocks 402 with the assigned bit budgets. Apportionment of the bit budget to the individual blocks 402 can be done in any technically feasible manner and can take into account a variety of aspects of the video, such as relative complexity, perceptual importance, and other measures of the content of the video. In addition, rate control 122 uses an estimation or prediction technique to assign quantization parameters to each block 402 based on the bit budgets. Again, quantization parameters do not directly determine the number of bits that an encoded block will consume, since the actual content of such blocks contributes a great deal.

In some examples, each encoder instance 121 calculates the complexity distribution independently. In some examples, the calculation is deterministic so that each encoder instance 121 achieves the same results. It should be understood that the encoder instances 121 utilize data from one or more previous frames to set the bit rate for a current frame. In some examples, at least a part of the calculation of complexity measures uses data from a first frame and occurs during encoding of that first frame. For example, in the course of performing operations for one or more of the prediction 124, transform 126, and entropy encode 128, an encoder instance 121 extracts data for one or more of those operations and calculates at least a portion of the complexity measures for the blocks, frame portions 202, and/or frames.

In some examples, the encoder instance 121 bypasses the described step, selecting a different technique for setting the bit budgets for the frame portions 202. In some examples, the encoder instance 121 performs this bypassing upon detecting a scene change. In some examples, an encoder instance 121 detects a scene change upon determining that the intra ratio is below a threshold. In other examples, an encoder instance 121 detects a scene change upon determining that the average sum of absolute difference for the blocks of a frame is above a threshold value. Any other technique for detecting a scene change is possible as well.

Figure 5:
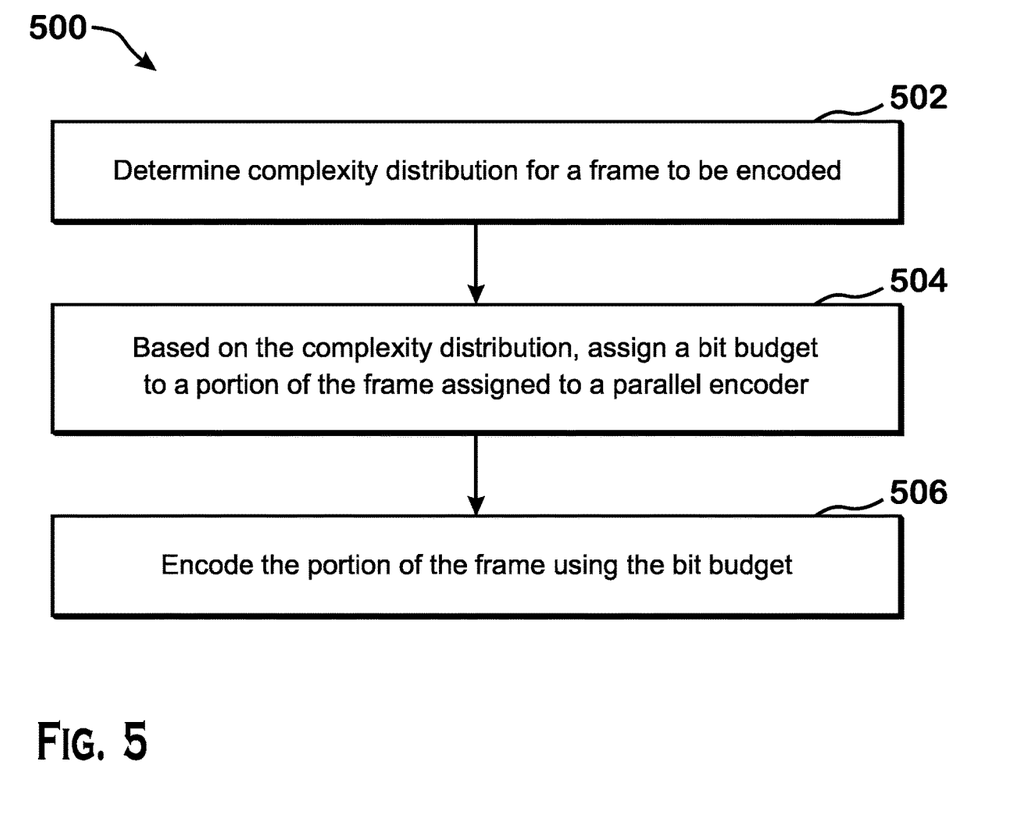
FIG. 5 is a flow diagram of a method for encoding video data, according to an example.

FIG. 5 is a flow diagram of a method 500 for encoding video data, according to an example. Although described with respect to the system of FIGS. 1-4, those of skill in the art will understand that any system configured to perform the steps of the method 500 in any technically feasible order falls within the scope of the present disclose At step 502, a parallel encoder instance 121 determines a complexity distribution for a frame to be encoded. Specifically, the parallel encoder instance 121 uses complexity metrics from a previous frame to determine the complexity distribution. A complexity distribution indicates a ratio of a bit budget for the portion of the frame assigned to the parallel encoder instance 121 to the bit budget assigned to the entire frame. The parallel encoder instance 121 determines the complexity as described elsewhere herein.

At step 504, based on the complexity distribution, the parallel encoder instance 121 assigns a bit budget to a portion of the frame assigned to the parallel encoder instance 121. In some examples, since the complexity distribution indicates a ratio of the bit budget for the portion for the parallel encoder instance 121 to the bit budget of the frame, the parallel encoder instance 121 multiplies the complexity distribution ratio value with the bit budget assigned to the entire frame to obtain the bit budget for the frame portion.

At step 506, the parallel encoder instance 121 encodes a frame portion assigned to that parallel encoder instance 121 using the determined bit budget. As described elsewhere herein, a rate control block 122 of the parallel encoder instance 121 divides the bit budget for one or more portions 202 assigned to the parallel encoder instance 121 between the blocks within the one or more portions 202. The rate control block 122 then encodes these blocks based on their assigned bit budgets. As described above, it is possible that the actual number of bits in the encoded blocks are different from the assigned number of bits. Thus, the rate control block 122 may adjust the total number of bits assigned to remaining blocks after encoding other blocks, in order to fit within the total bit budget assigned to the one or more portions 202 associated with the parallel encoder instance 121. As stated elsewhere, the rate control block 122 uses any known technique to assign bit budgets and quantization parameters to the individual blocks of the one or more portions 202. However, the rate control block 122 assigns the bit budgets to the blocks such that the total bit budget assigned to all blocks of the one or more portions 202 is equal to or "close to" the total bit budget assigned to the one or more portions 202 according to the complexity distribution technique described herein.

Each of the various units, blocks, or elements described herein, such as the parallel encoder 120, encoder instances 121, rate control block 122, prediction block 124, transform block 126, entropy encode block 128, decoder 150, entropy decode block 152, inverse transform block 154, and reconstruct block 156, are implemented, where appropriate, as software, hardware (e.g., circuitry), or a combination thereof.

Although the techniques are described herein as being performed for a system including multiple parallel encoders, other implementations alternatively include one encoder that performs encoding for different sections of a frame sequentially. Specifically, in the case of a one-pass sequential encoding, the encoder does not know the complexity distribution of a current frame until the encoder encodes the entire frame. In the case where the complexity within a frame is distributed unevenly, rate control uses the average bit budget per block to adjust QP values at the block level, but this adjustment could cause quality fluctuation. Thus, when the encoder processes a frame, the encoder makes a prediction about the bit budgets for the blocks of a frame based on the historical complexity as described above. In other words, single, non-parallel encoder uses the historical complexity distribution, determined as described above, to make predictions about bit-budgets for blocks of the current frame, and encodes those blocks based on those predictions.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
for a first portion of a first frame that is encoded by a first encoder in parallel with a second portion of the first frame that is encoded by a second encoder, determining a historical complexity distribution;
determining a first bit budget for the first portion of the first frame based on the historical complexity distribution; and
encoding the first portion of the first frame by the first encoder, based on the first bit budget.

2. The method of claim 1, wherein the historical complexity distribution comprises a ratio of a complexity measure of the first portion to the complexity measure of the first frame.

3. The method of claim 1, wherein determining the first bit budget comprises applying the historical complexity distribution to a bit budget for the first frame.

4. The method of claim 1, wherein determining the historical complexity distribution comprises analyzing data from a previous frame that is prior to the first frame.

5. The method of claim 1, wherein determining the historical complexity distribution comprises determining a plurality of complexity measures for blocks of the first portion and combining the plurality of complexity measures to obtain a complexity measure of the first portion.

6. The method of claim 5, wherein determining the historical complexity distribution comprises dividing the complexity measure of the first portion by a complexity measure of the first frame.

7. The method of claim 5, wherein determining a complexity measure of the plurality of complexity measures comprises determining at least one of a sum of absolute differences, a rate distortion cost, a historical bit budget, or a number of non-zero discrete cosine transform coefficients.

8. The method of claim 5, wherein determining the plurality of complexity measure occurs during encoding of a previous frame that is prior to the first frame.

9. The method of claim 1, wherein encoding the first portion based on the first bit budget comprises setting encoding parameters for the first portion to encode the first portion as an encoded first portion having a number of bits specified by the first bit budget.

10. An encoding system comprising:
a first encoder circuit; and
a second encoder circuit,
wherein the first encoder circuit is configured to:
determine a historical complexity distribution of a first portion of a first frame,
determine a first bit budget for the first portion of the first frame based on the historical complexity distribution, and
encode the first portion of the first frame, based on the first bit budget,
wherein the second encoder circuit is configured to encode a second portion of the first frame in parallel with the first encoder circuit encoding the first portion of the first frame.

11. The encoding system of claim 10, wherein the historical complexity distribution comprises a ratio of a complexity measure of the first portion to the complexity measure of the first frame.

12. The encoding system of claim 10, wherein determining the first bit budget comprises applying the historical complexity distribution to a bit budget for the first frame.

13. The encoding system of claim 10, wherein determining the historical complexity distribution comprises analyzing data from a previous frame that is prior to the first frame.

14. The encoding system of claim 10, wherein determining the historical complexity distribution comprises determining a plurality of complexity measures for blocks of the first portion and combining the plurality of complexity measures to obtain a complexity measure of the first portion.

15. The encoding system of claim 14, wherein determining the historical complexity distribution comprises dividing the complexity measure of the first portion by a complexity measure of the first frame.

16. The encoding system of claim 14, wherein determining a complexity measure of the plurality of complexity measures comprises determining at least one of a sum of absolute differences, a rate distortion cost, a historical bit budget, or a number of non-zero discrete cosine transform coefficients.

17. The encoding system of claim 14, wherein determining the plurality of complexity measure occurs during encoding of a previous frame that is prior to the first frame.

18. The encoding system of claim 10, wherein encoding the first portion based on the first bit budget comprises setting encoding parameters for the first portion to encode the first portion as an encoded first portion having a number of bits specified by the first bit budget.

19. A non-transitory computer-readable medium storing instructions that, when executed by a processor, cause the processor to perform operations comprising:
for a first portion of a first frame that is encoded by a first encoder in parallel with a second portion of the first frame that is encoded by a second encoder, determining a historical complexity distribution;
determining a first bit budget for the first portion of the first frame based on the historical complexity distribution; and
encoding the first portion of the first frame by the first encoder, based on the first bit budget.

20. The non-transitory computer-readable medium of claim 19, wherein the historical complexity distribution comprises a ratio of a complexity measure of the first portion to the complexity measure of the first frame.

* * * * *